United States Patent
Jalali et al.

(10) Patent No.: US 10,132,917 B2
(45) Date of Patent: Nov. 20, 2018

(54) SYSTEMS AND METHODS OF LOCATION AND TRACKING

(71) Applicant: Bridgewest Finance LLC, San Diego, CA (US)

(72) Inventors: Ahmad Jalali, Rancho Santa Fe, CA (US); Dhinakar Randakrishnan, San Diego, CA (US); Mehran Baghaei, San Diego, CA (US)

(73) Assignee: Bridgewest Finance LLC, San Diego, CA (US)

( * ) Notice: Subject to any disclaimer, the term of this patent is extended or adjusted under 35 U.S.C. 154(b) by 519 days.

(21) Appl. No.: 14/832,007

(22) Filed: Aug. 21, 2015

(65) Prior Publication Data

US 2016/0054429 A1 Feb. 25, 2016

Related U.S. Application Data (63) Continuation-in-part of application No. 14/797,875, filed on Jul. 13, 2015, now Pat. No. 9,998,859, and a continuation-in-part of application No. PCT/US2015/017423, filed on Feb. 25, 2015, and a continuation-in-part of application No. 14/284,384, filed on May 21, 2014, now Pat. No. 9,784,816.

(60) Provisional application No. 61/944,115, filed on Feb. 25, 2014.

(51) Int. Cl.
| | |
|---|---|
| *G01S 5/02* | (2010.01) |
| *G06K 7/10* | (2006.01) |
| *H04L 12/18* | (2006.01) |
| *H04W 4/021* | (2018.01) |
| *H04W 4/02* | (2018.01) |
| *H04W 84/12* | (2009.01) |

(52) U.S. Cl.
CPC .......... *G01S 5/0294* (2013.01); *G01S 5/0236* (2013.01); *G01S 5/0289* (2013.01); *G06K 7/10009* (2013.01); *H04L 12/189* (2013.01); *H04W 4/021* (2013.01); *H04W 4/023* (2013.01); *H04W 84/12* (2013.01)

(58) Field of Classification Search
CPC .... G01S 5/0294; G01S 5/0236; G01S 5/0289; H04W 4/021; H04W 4/023; G06K 7/10009; H04L 12/189
USPC ...................................... 342/451; 340/539.13
See application file for complete search history.

(56) References Cited

U.S. PATENT DOCUMENTS

| | | | |
|---|---|---|---|
| 5,774,876 A * | 6/1998 | Woolley ................ | G01S 5/0289 235/385 |
| 6,917,290 B2 * | 7/2005 | Land ........................ | G01S 5/02 340/539.1 |
| 7,092,943 B2 | 8/2006 | Roese | |

(Continued)

*Primary Examiner* — Chuong P Nguyen
(74) *Attorney, Agent, or Firm* — Klein, O'Neill & Singh, LLP (57) ABSTRACT

A position location system is described for determining position of mobile tags attached to assets or people. Zone tags are installed in the venue to assist in position location estimation of mobile Tags. One embodiment describes systems and methods for the zone tags to automatically determine their position location. Another embodiment describes systems and methods to detect that a zone tag has been moved and to determine the new position of the moved zone tags. Another embodiment describes systems and methods whereby mobile tags determine a list of zone tags with which to make range measurement for determining the mobile tag's position location.

20 Claims, 7 Drawing Sheets

(56) References Cited

U.S. PATENT DOCUMENTS

| | | | |
|---|---|---|---|
| 7,228,228 B2 | 6/2007 | Bartlett | |
| 7,558,852 B2 | 7/2009 | Douglas | |
| 8,072,311 B2* | 12/2011 | Sadr | G01S 5/12 |
| | | | 340/10.1 |
| 8,219,094 B2 | 7/2012 | Huber | |
| 8,253,538 B1 | 8/2012 | Chu | |
| 8,294,554 B2 | 10/2012 | Shoarinejad | |
| 8,344,949 B2 | 1/2013 | Moshfeghi | |
| 8,565,133 B2 | 10/2013 | Chen | |
| 8,611,321 B2 | 12/2013 | Herrala | |
| 9,113,343 B2 | 8/2015 | Moshfeghi | |
| 9,288,623 B2* | 3/2016 | Markhovsky | H04W 4/90 |
| 9,404,996 B2 | 8/2016 | Yamada | |
| 9,551,775 B2* | 1/2017 | Rangarajan | G01S 1/08 |
| 9,998,859 B2* | 6/2018 | Jalali | G06K 7/10009 |
| 2004/0027251 A1 | 2/2004 | Sharony | |
| 2007/0103303 A1 | 5/2007 | Shoarinejad | |
| 2008/0150695 A1* | 6/2008 | Batra | G01S 13/74 |
| | | | 340/10.1 |
| 2008/0278292 A1* | 11/2008 | Nierenberg | G08C 21/00 |
| | | | 340/10.3 |
| 2009/0121867 A1 | 5/2009 | Park | |
| 2010/0073235 A1 | 3/2010 | Smith | |
| 2010/0074133 A1 | 3/2010 | Kim | |
| 2010/0134178 A1 | 6/2010 | Nakamura | |
| 2010/0135178 A1 | 6/2010 | Aggarwal | |
| 2011/0128148 A1* | 6/2011 | Nierenberg | G08C 21/00 |
| | | | 340/539.13 |
| 2012/0113902 A1 | 5/2012 | Shoarinejad | |
| 2015/0156746 A1 | 6/2015 | Horne | |
| 2015/0241551 A1* | 8/2015 | Jalali | G06K 7/10009 |
| | | | 342/451 |
| 2015/0271643 A1* | 9/2015 | Jalali | H04W 4/023 |
| | | | 455/456.1 |
| 2015/0304810 A1* | 10/2015 | Jalali | H04W 4/02 |
| | | | 370/336 |
| 2015/0319572 A1 | 11/2015 | Jalali | |
| 2016/0054429 A1* | 2/2016 | Jalali | G01S 5/0294 |
| | | | 342/451 |
| 2017/0041763 A1 | 2/2017 | Jalali | |
| 2017/0220985 A1* | 8/2017 | White | G06Q 10/087 |

\* cited by examiner

SYSTEMS AND METHODS OF LOCATION AND TRACKING

RELATED APPLICATIONS

This application claims priority to U.S. Nonprovisional patent application Ser. No. 14/797,875, filed Jul. 13, 2015, entitled: "Systems and Methods of Location and Tracking" U.S. Nonprovisional patent application Ser. No. 14/797,875 claims priority to PCT Patent Application No. PCT/US15/017423 entitled "Systems and Methods of Location and Tracking" filed Feb. 25, 2015, which application claims priority to U.S. Non-provisional patent application Ser. No. 14/284,384, entitled: "Systems and Methods of Location and Tracking" filed May 21, 2014 and to U.S. Provisional Application Ser. No. 61/944,115, filed Feb. 25, 2014 and entitled: "Systems and Methods of Location and Tracking", the contents of each which are incorporated by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A number of systems have been developed and deployed to locate and track the position of people and assets collectively ("assets") in local area environments such as office buildings, hospitals, shopping malls, and hotels, industrial environments such as refineries, oil rigs, and manufacturing facilities. Many of these systems, however, provide position accuracy of within a few meters using an existing Wi-Fi or Bluetooth network.

Position location accuracy of a few meters may suffice in some applications such as locating a tool in an industrial environment such as in a refinery, in an aircraft hangar etc. In some applications, however, accuracy of less than one meter is required. Many of the applications requiring high position location precision involve establishing close association of two assets (e.g. two persons, a person and some equipment or two pieces of equipment. In many cases, it is not necessary that the precise location of a person or object (i.e. asset) to be known, but rather the association of the two is needed which requires determining that an asset is in the proximity of another asset. For instance, hospitals would like to record if a doctor or a nurse has visited a certain patient during the day. In this application, what is important is to record that the doctor/nurse was in proximity of the patient at certain time. The position location accuracy requirement for this case is often referred to as "room level" accuracy meaning that the doctor/nurse must be located in the right room. However, as mentioned above if the objective is to ensure that the doctor/nurse visited the patient during the day, then it is really detecting the close proximity of the doctor/nurse and the particular patient that is needed and not necessarily accurately locating the doctor/nurse. In rooms with multiple beds, the doctor/nurse must be associated with the right patient in that room. Another example of room level accuracy is in hotels where it is desirable to locate a maid in the right room in case there is an emergency, or to be able to verify that someone has cleaned a specific room.

One manufacturing use case is to adjust the torque of a wrench depending on the specific manufacturing part the tool is trying to fasten. This again is a case of detecting proximity of the tool and a manufacturing part. Another example of the need to detect proximity is to ensure that certain medical equipment such as an IV pump is in fact attached to a certain patient. Another example is to register that doctors/nurses have washed their hands prior to certain functions such as visiting a patient. This application again requires detection of close proximity of the doctor/nurse and a sink/disinfectant station.

Another application for accurate position location in retail environment is to direct the customer to the right location in the store for a given item. Here one would want a very accurate positioning scheme to navigate the customer through the store so that the customer gets very close to the item he/she is searching.

SUMMARY

The current invention is directed to systems and methods for determining relative location of a zone tag within a local monitoring zone of a wireless network comprising the apparatus and steps of providing a plurality of zone tags, the zone tags having a wireless transceiver configured to communicate over the wireless network. The plurality of zone tags is placed in the local monitoring zone, with each of the plurality of zone tags being placed at a known position stored on a position server. An un-configured zone tag is placed within the local monitoring zone, with the un-configured zone tag communicating wirelessly with the remaining plurality of zone tags. The position server receives un-configured zone tag to zone tags within the plurality communication times and determines a relative position for the un-configured zone tag as a function of the communication times.

BRIEF DESCRIPTION OF THE DRAWINGS

Following drawings in conjunction with detailed description help clarify the features and advantages of the present disclosure. In the figures, similar components are identified using the same reference label. Multiple instances of the same component in a figure are distinguished by inserting a dash after the reference label and adding a second reference label.

DETAILED DESCRIPTION

The FIGURES and text below, and the various embodiments used to describe the principles of the present invention are by way of illustration only and are not to be construed in any way to limit the scope of the invention. A Person Having Ordinary Skill in the Art (PHOSITA) will readily recognize that the principles of the present invention maybe be implemented in any type of suitably arranged device or system. Specifically, while the present invention is described with respect to use in Wi-Fi networks and Access Points therein, a PHOSITA will readily recognize other types of networks and other applications without departing from the scope of the present invention.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by a PHOSITA to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The embodiments in this disclosure are described in the context of an IEEE 802.11 based network for illustration purposes. However, the embodiments apply to a more general wireless protocol. In the exemplary wireless system described next, the indoor position location system complements an existing IEEE 802.11 WLAN network to provide high precision indoor position location information for mobile tags secured to generally immobile assets, such as equipment or mobile assets such as cellular telephones.

Figure 1:
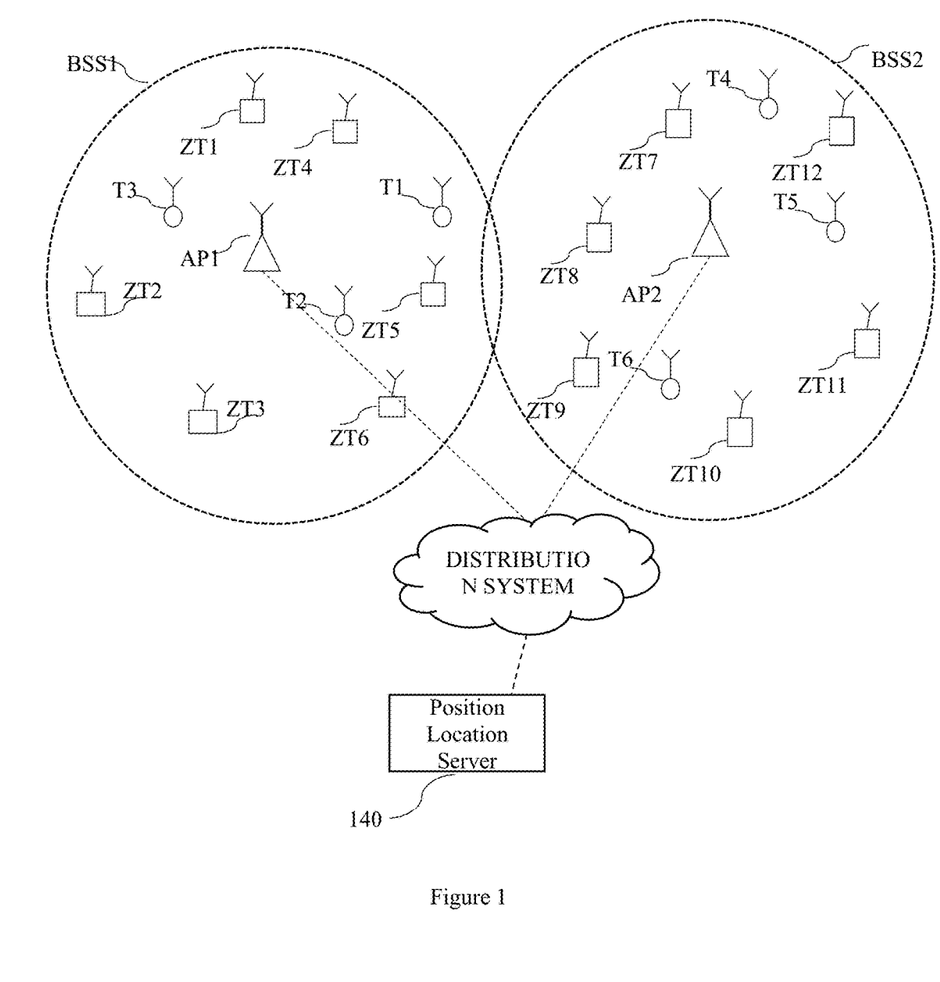
FIG. 1 is an exemplary diagram of elements of a position location system.

FIG. 1 shows a typical IEEE 802.11 network deployment. Access Points (APs) are labeled as APi, where i is an integer identifying different APs. There are multiple IEEE 802.11 APs designated as AP1, AP2, etc. Each of the APs form a Basic Service Set (BSS), which is identified by a unique BSSID, also referred to as a local monitoring zone. The BSSs are typically interconnected to form an Extended Service Set (ESS), and share the same security credentials thereby facilitating easy movement of WiFi devices between different BSSs. FIG. 1 shows a sample IEEE 802.11 network with 2 BSSs, each of the BSSs has one AP. The BSSs can optionally be linked to form an ESS. Note that the different BSSs, such as for instance the adjacent BSSs, may be operating on different frequency channels to minimize interference between BSSs.

APs are the network WiFi elements that may already have been installed for internet access in a given building or campus. In addition to APs, a number of auxiliary APs referred to as zone tags, labeled as Bi, where i is an integer identifying different zone tags, are also installed in the venue. Zone tags have similar capability as the WiFi APs do, and provide range measurements with mobile tags to determine the mobile tags' position location. In other words, zone tags complement the APs in the legacy WiFi network in a given venue. zone tags may provide the same functionality as the IEEE 802.11 APs or IEEE 802.11 Stations (STAs), but whose primary function is to provide range measurements with the mobile tags. In fact, in a venue where there is no legacy WiFi network, then some of the zone tags will be configured to act as APs.

Referring to FIG. 1, in addition to APs, the system includes a number of auxiliary zone tags ZT1, ZT2 etc. As mentioned above, mobile tags are WiFi enabled devices installed on assets and carried by people, and are capable of communicating with the APs and zone tags. Mobile tags are labeled by Tj, where j is an integer and denotes occurrences of mobile tags. The position location server 140 schedules Round Trip Delay (RTD) or Time Of Arrival (TOA) measurements between mobile tags and multiple zone tags, and carries out triangulation using the RTD or TOA measured values to determine the position of the mobile tag, and sends the computed position location to other parts of the network (not shown in FIG. 1). As mentioned above, the APs and Zone tags may use any number of wireless protocols for communications and range measurements for position location determination.

Figure 3:
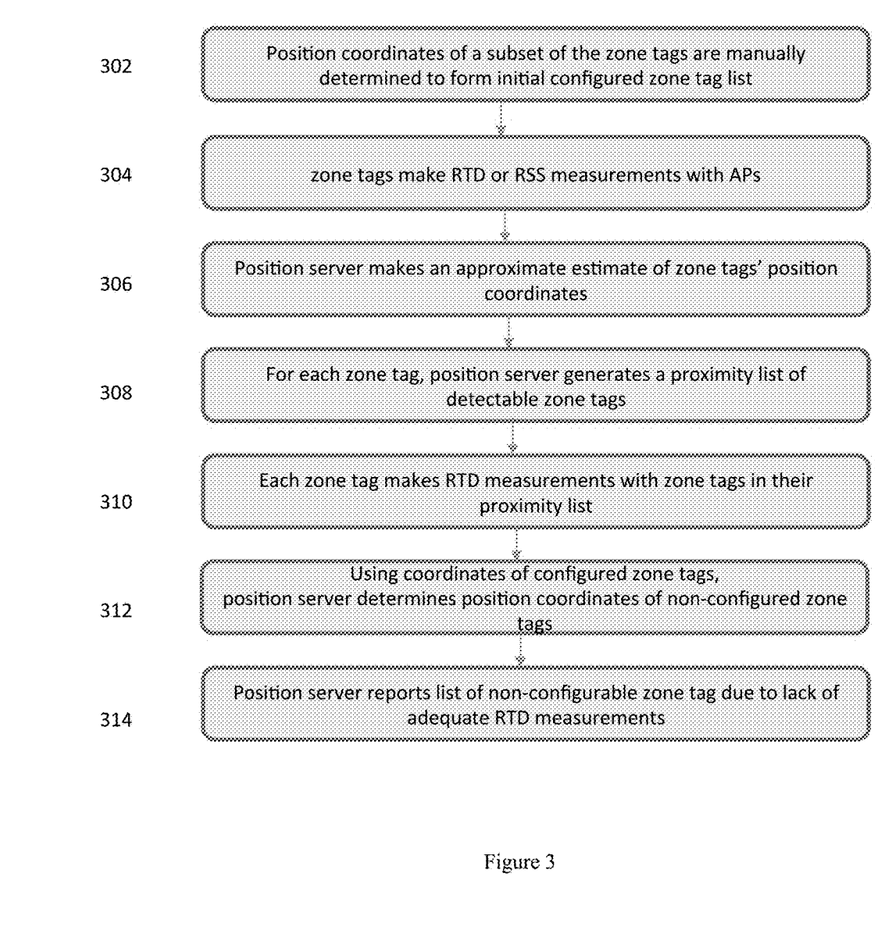
FIG. 3 is an exemplary flow chart of the process for zone tags to autonomously determine their position locations.

Certain embodiments describe systems and methods for initial deployment of the network of zone tags. FIG. 3 is a flow chart of an exemplary process used to determine the position coordinates of the zone tags in the network. In step 302, position coordinates of a subset of the zone tags are manually determined. In step 304, zone tags make RTD or RSS measurements with APs. In step 306, the position sever makes an approximate estimate of the zone tags' position coordinates based on the reported RTD or RSS measurements with APs. In step 308, for each zone tag, the position server generates proximity list of detectable zone tags. In step 310, zone tags make RTD measurements with zone tags in their proximity list. The position server, in step 312 determines the position coordinates of the zone tags using knowledge of the position coordinates of the configured zone tags. The position server, in step 314 reports the list of zone tags whose position coordinates may not be accurately determined due to lack of adequate number of RTD measurements. More consideration will be given to each of these steps below.

Zone tag network deployment begins by installing a subset of the zone tags to be deployed in the local monitoring zone, referred to as configured zone tags, and manually determining the position location coordinates of the configured zone tags and sending the position coordinates to the position server 140 302. The system determines the position information for other zone tags to be deployed in the local monitoring zone, as further described in described next. Each zone tag, after being placed and powered on, will search for APs in the network and associate with the AP from which it receives the strongest signal. Once a newly installed zone tag associates with an AP/BSS, the zone tag makes RTD measurement as well as RSS (Received Signal Strength) on signal received from the AP, and sends the measured RTD and RSS values to the position location server 140 304. zone tags may make RTD and RSS measurements with multiple APs and send the results to the position location so that the position location server may make an estimate of the position of each zone tag, using triangulation or other processes known in the art 306.

Once all zone tags ZTn have been placed, and an initial approximate position of all zone tags has been determined by the position server 140, then the position server 140 creates a proximity list for each zone tag 308. The proximity list for a zone tag contains a set of other zone tags which are in close proximity to the first zone tag. The proximity list for a first zone tag is intended to include those zone tags within transmission distance of the signals of the first zone tag may be able to detect. The position server 140 generates the proximity list for each zone tag, and sends the proximity lists to the zone tags 308. Note that the position server determines the proximity list based on approximate position of each zone tag, and does not have knowledge of the signal strength the zone tags receive from each other. The zone tags make RTD measurements with other zone tags in their proximity list. There may be some zone tags in the proximity list of a first zone tag whose signals the first zone tag may not be able to detect. Once each zone tag has attempted to make RTD measurements with zone tags in its proximity list, then each zone tag will remove those zone tags in its proximity list with whom the zone tag could not complete RTD measurements 314.

Figure 2A:
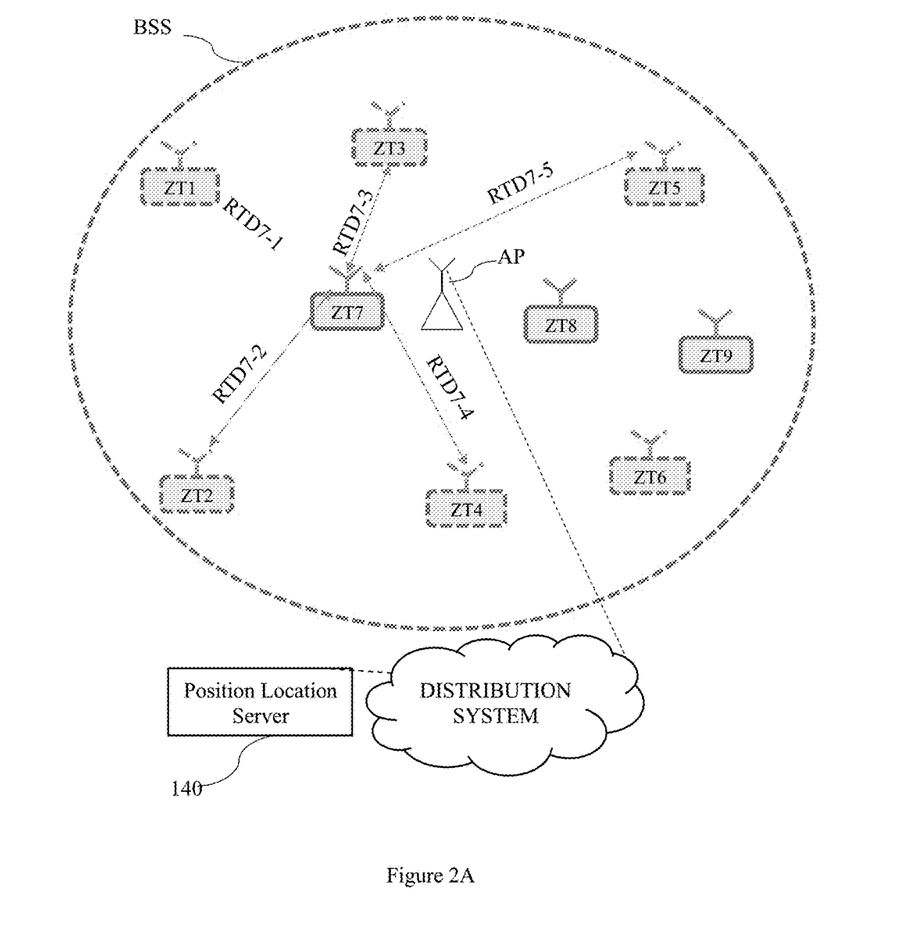
FIGS. 2A, 2B, and 2C are exemplary diagrams illustrating zone tags autonomously determining their position locations.
Figure 2B:
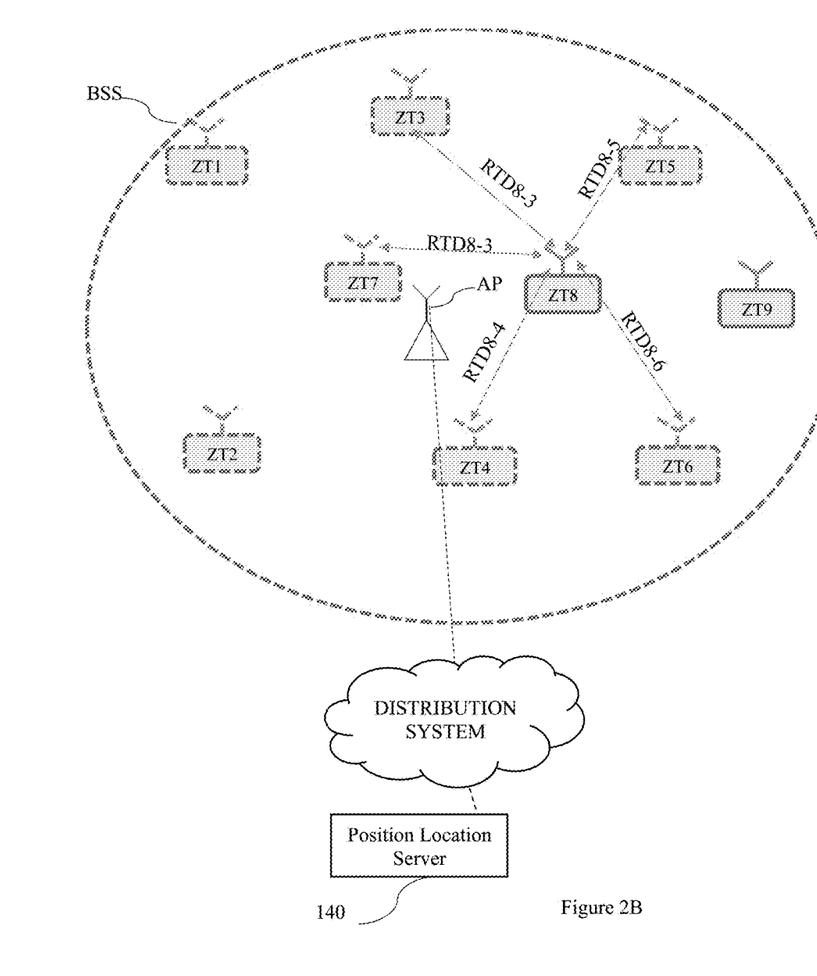
Figure 2C:
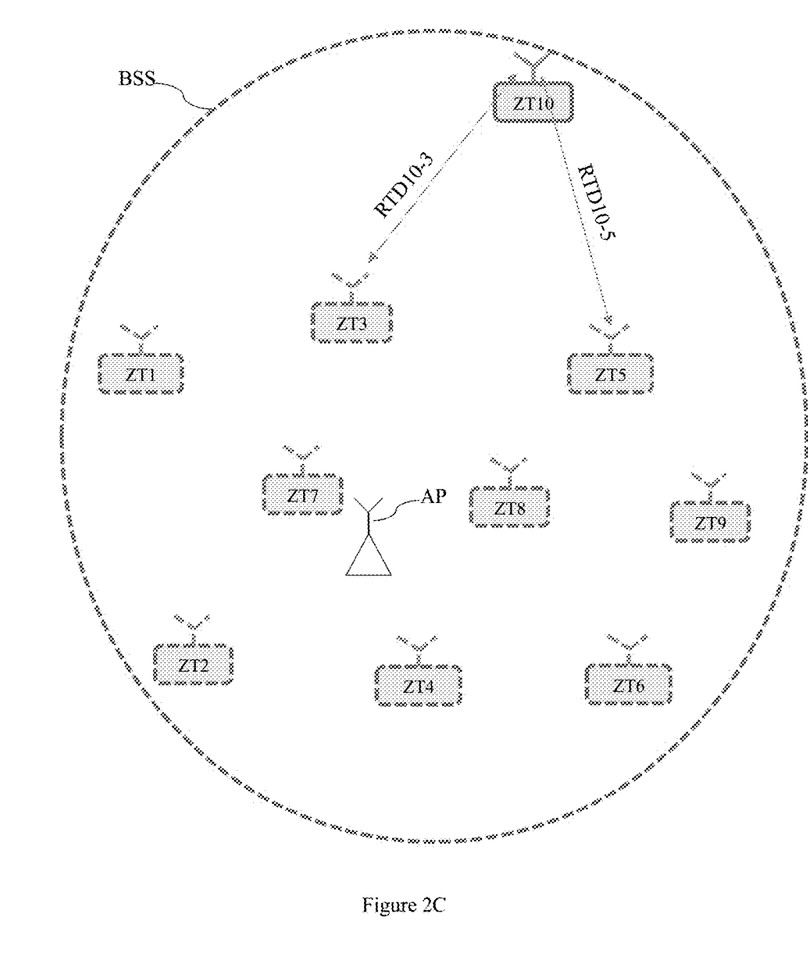

An un-configured zone tag is one whose position location has not been yet determined. Once an un-configured zone tag has made RTD measurements with the configured zone tags in its proximity list, the zone tag will send the RTD values to the position server 140. If the zone tag has made RTD measurements with an adequate number of configured zone tags, then the position server will estimate the location of the zone tag and will add the zone tag to the configured list 312. FIG. 2A illustrates one BSS with 6 configured zone tags (ZT1 through ZT6), and 3 un-configured zone tags ZT7, ZT8 and ZT9; configured zone tags are shown by dashed line, and un-configured zone tags are shown by solid lines. As shown in FIG. 2A, un-configured zone tag ZT7 makes RTD measurements with zone tags ZT1 through ZT6, the position server estimates zone tag ZT7's position based on the 6 measured RTD values and adds zone tag ZT7 to the list of configured zone tags as shown by dashed line in FIG. 2B. Next, as shown in FIG. 2B, zone tag ZT8 makes RTD measurements with zone tags ZT3 through ZT7, and the position location server determines the position of ZT8 based on the 5 measured RTD values. This process continues until every un-configured zone tag has made RTD measurements with zone tags in its proximity list and the position server has attempted to estimate the position of each un-configured zone tag based on the RTD measurements reported by each zone tag. In exemplary configuration, at least three RTD or TOA values are employed in the position estimation. It may turn out that some of the un-configured zone tags will not be able to make RTD measurements with an adequate number of configured zone tags for the position server to be able to make an accurate estimate of the un-configured zone tag's position coordinates. As in illustration FIG. 2C shows zone tag ZT10 which can only make RTD measurements with zone tags ZT3 and ZT5. Since 2 RTD measurements are not adequate to obtain an accurate position estimate, the zone tag ZT10 is considered non-configurable, unless additional zone tags are deployed between zone tag ZT10 and the remainder of the network. Then, the position server reports the non-configurable zone tags to the system administer. The system administer then will add new zone tags or move some of the existing zone tags so that each zone tag will have an adequate number of zone tags in its proximity list with which to make RTD measurements to make an accurate estimate of the zone tag's position location coordinates.

The list of zone tags whose signals are detectable by a given zone tag, referred to as the proximity list above, was determined by the position server based on RTD or RSS measurements between zone tags and APs. Alternatively, each zone tag may determine the list of zone tags whose signals it may detect using a discovery scheme as described next. Each zone tag sends a discovery message. The exemplary discovery message is a broadcast over the network that includes the transmitting zone tag's identifier and a flag indicating its discovery message type. Zone tags search for discovery messages from other zone tags, and add any zone tag whose discovery message they detect to their discovered zone tag list. Then, zone tags make RTD measurements with zone tags in their discovered lists. The remaining process for configuring the zone tags is that same as that described above when using proximity list approach.

In usage of the zone tags, it is possible that someone may move or remove some of the zone tags. The current invention provides systems and methods to detect that a zone tag has been moved, to determine the new position coordinates of the moved zone tags, and to update the zone tag configuration.

Figure 4:
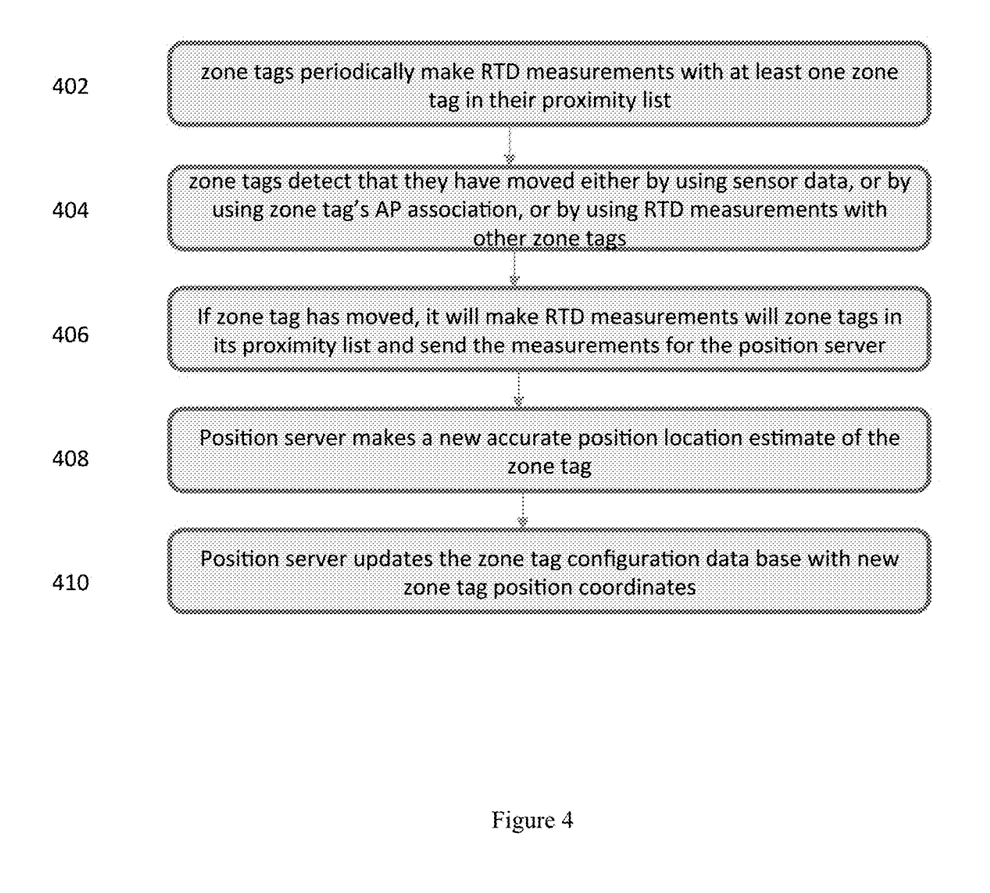
FIG. 4 is an exemplary flow chart of the process to detect a zone tag has been moved and to update the zone tag configuration data base.

In one embodiment, each zone tag is equipped with sensors which will detect the motion of the zone tag when a zone tag is moved, and the zone tag will report the motion event to the position server. FIG. 4 is an exemplary flow chart of the process to detect that a zone tag has been moved, and to update the zone tag configuration data base. In step 402, zone tags periodically make RTD measurements with at least one zone tag in their zone tag proximity list and send the measurements to the position server 140. In step 404, zone tags detect if they have moved by either using sensor readings, or using information on zone tag's AP association, or by using periodic RTD measurements with zone tags in their proximity list. For example, the position server 140, based on the reported RTD/RSS measurements, determines if the zone tag has been moved. If a first zone tag is moved, then the RTD/RSS value from the first zone tag to at least one other zone tag will be different from the previous measurement. In another example, motion sensors trigger the process for a position update. If it is determined that the zone tag has been moved, then in step 406 the zone tag makes RTD measurements with all zone tags in its zone tag-proximity-list, and report the measurements to the position server 140. If the position server 140 determines that the zone tag has moved, it may request that the zone tag make RTD measurements with all zone tags in its proximity list in order to make a new accurate estimate of the zone tag's position coordinates. In step 408, the position server makes a new accurate estimate of the position location coordinates of the moved zone tag. If the zone tag has been moved, then the position server 140 updates the zone tag configuration data base based on the zone tag's new position coordinates. zone tags may also periodically measure RSS of signals received from different APs, and change the AP with which they are associated if there is another AP from which the zone tag receives a stronger signal. In the event a first zone tag changes the AP with which it is associated, the position server 140 may prompt the first zone tag to measure RTD/RSS measurements with zone tags in its zone tag-proximity-list in order to update the position coordinates of the first zone tag. In step 410, the position server updates the bacon configuration data base with the zone tag's new position coordinates.

Next, with reference to FIG. 1, we described systems and methods to assign mobile tags to a set of zone tags with which to make range measurements. The range measurements are used by the position location server 140 to triangulate to determine the mobile tags' $T_n$ position coordinates.

First, we consider a position location system that uses RTD measurements for position location determination. In order to determine the position of a mobile tag, the tag makes RTD measurements with a set of nearby zone tags. In one embodiment, the mobile tag upon associating with an AP, makes RSS or RTD measurements with at least one AP, and reports the measurements to the position server. The mobile tag may make RSS/RTD measurements with other APs, whose signals the mobile tag may detect, and send the measured information to the position server 140. The position server 140 makes an approximate position location estimate of the mobile tags, and identifies a set of zone tags that are in proximity to the mobile tag, referred to as the mobile tag-zone tag-proximity-list. The position server 140 sends the mobile tag-zone tag-proximity-list to each tag, and schedules RTD measurements between the mobile tag and zone tags in the mobile tag's zone tag list.

Figure 5:
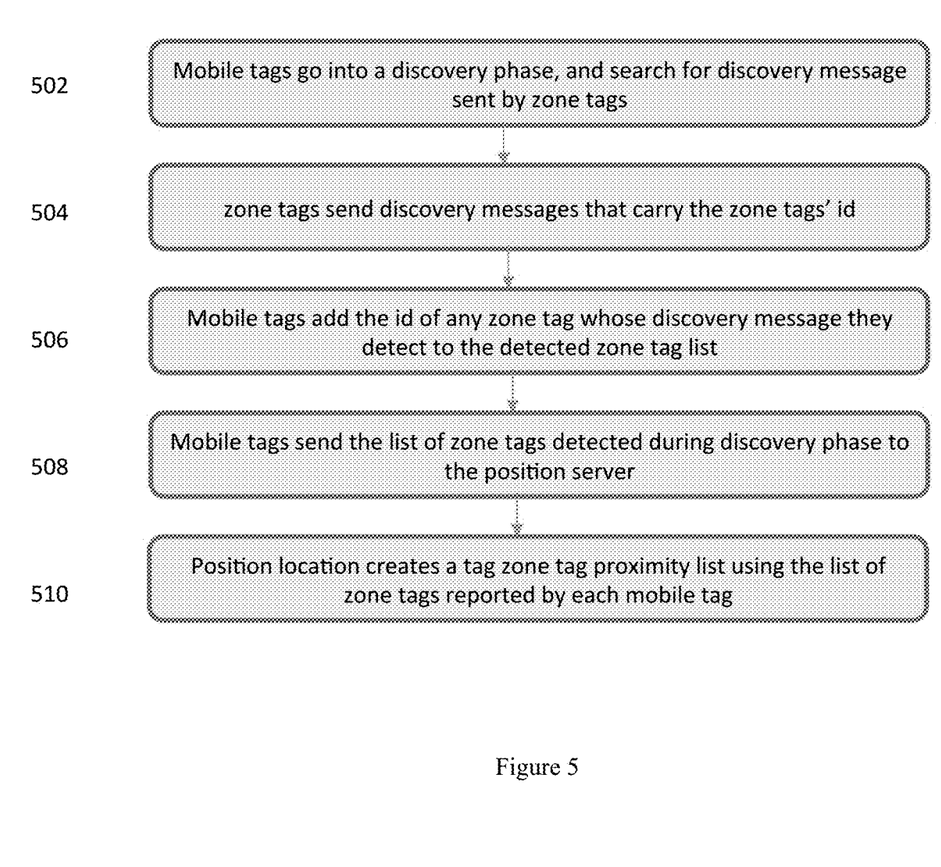
FIG. 5 is an exemplary flow chart of the process to create a tag-zone tag-proximity-list for each mobile tag.

In the alternate embodiment of FIG. 5, a flow chart of an exemplary process to determine a mobile tag-zone tag-proximity-list for each mobile tag $T_j$ is shown. In step 502, the mobile tags enter discovery phase and search for discovery messages sent by zone tags. the position server 140 requests that the mobile tag go into a discovery phase to determine all zone tags from which it can detect a signal in order to form a mobile tag-zone tag-proximity-list. During the discovery phase, the mobile tag will listen to the frequency channel that the position server 140 has specified, and will detect all signals sent by APs and zone tags on the given frequency channel.

In step 504, zone tags send discovery messages. The mobile tag will read the source address of the zone tag whose message it has detected and once the discovery phase period is finished, will send a message to the position server 140 with the source address of all the zone tags whose message the mobile has detected.

In step 506, the mobile tags add the id of zone tags they detect to a detected zone tag list. In step 508, the mobile tags send the list of zone tags detected at the end of discovery phase to the position location server. Position location server 140, in step 510, creates mobile tag-zone tag-proximity-lists using the list of detected zone tags sent by each mobile tag. The position server 140 will then use the list of zone tags sent by the mobile tag as the tag-zone tag-proximity-list, and will schedule RTD measurements between the mobile tag and the zone tags on the discovered mobile tag-zone tag-proximity-list.

In the position location determination system that uses TOA instead of RTD, the tag-zone tag-proximity-list need only contain one zone tag. In the TOA based system, one zone tag on the mobile tag-zone tag-proximity-list is chosen as the mobile tag's primary zone tag. The mobile tag's primary zone tag may be the one that is closets to the mobile, or the one from which the mobile tag receives the strongest signal. The TOA range measurement process begins by the primary zone tag sending a data frame to the mobile; the mobile tag responds with an acknowledgment frame. All zone tags on the mobile tag's mobile tag-zone tag-proximity-list will detect the acknowledge message sent by the mobile tag and measure the message's TOA. The zone tags send the TOA range measurements to the position location server for triangulation to determine the mobile tag's position coordinates.

The mobile tag's position coordinates are periodically updated. As the mobile tags move, the position location server uses the updated mobile tag position coordinates to update the mobile tag-zone tag-proximity-list. The position server will choose the zone tags that are closest to the latest mobile tag position to be included in the mobile tag-zone tag-proximity-list. The position location server uses the updated mobile tag-zone tag-proximity-list to schedule range measurements with the mobile tag.

What is claimed is:

1. A system for automatic installation and configuration of zone tags in a position location determination system having mobile tags and zone tags comprising:
   the position coordinates of a subset of the zone tags are manually determined, referred to as configured zone tag list, and the remaining zone tags are put in an un-configured list;
   for a first zone tag, position server determines list of zone tags which are in close proximity to a first zone tag and whose signals the first zone tag can detect, referred to as a zone tag-proximity-list; and
   iteratively:
   retrieving the first zone tag from said un-configured list;
   making range measurements comprising RTD (round trip delay), between the first un-configured zone tag and the set of configured zone tags in the zone tag-proximity-list of said first zone tag; and
   position server verifying if there are enough zone tags in the first zone tag's zone tag-proximity-list to make an accurate estimate of the first zone tag's position location; and
   determining the first un-configured zone tag's position using the range measurements, and adding the first zone tag whose position has been determined to the configured zone tag list.

2. A system according to claim 1, wherein to create the zone tag-proximity-list the first zone tag makes signal strength and range measurements comprising round trip delay with at least one access point in the network, and sends the measurements to the position server; and
   position server makes an estimate of position location of the first zone tag using the reported measurements, and adds those zone tags which are in close proximity to the first zone tag to the first zone tag's zone tag-proximity-list.

3. A system according to claim 1, wherein to create the zone tag-proximity-list of the first zone tag the position server puts the zone tags into a discovery phase, where each zone tag sends discovery messages with the zone tags ID; and the first zone tag searches for discovery messages from other zone tags, and forms the zone tag-proximity-list of said first zone tag by adding the ID of the zone tags whose discovery messages the first zone tag detects.

4. The system of claim 1, whereby the position server creates a list of zone tags whose position location may not be accurately estimated due to lack of adequate number of measurements, reports the list to a system administrator, and the system administrator adds zone tags to the network to provide adequate number of range measurements to make accurate position estimates of the remaining zone tags in the un-configured list.

5. The system according to claim 1 for detecting that zone tags have moved, whereby: zone tags employ sensors that detect motion: and
the zone tag whose sensor detects movement reports the movement to the position server.

6. The system according to claim 1 for detecting that zone tags have moved, whereby: each zone tag makes periodic range measurements with at least one zone tag in its zone tag-proximity-list, and sends the measurements to the position sever; and the position server determines if the zone tag has moved.

7. The system of claim 1, whereby:
each mobile tag makes signal strength and range measurements with at least one access point in the network, and sends the measurements to the position server; and
position server makes an estimate of position location of the mobile tag using the reported measurements, and forms a list of zone tags which are in close proximity to the mobile tag, referred to as the mobile tag's tag-zone tag-proximity-list.

8. The system of claim 7, whereby mobile tags make range measurements with the zone tags in the mobile tag's tag-zone tag-proximity-list, send the measurements to the position server, and the position server makes an estimate of the mobile tag's position location using the range measurements.

9. The system of claim 1, whereby:
the position server puts the zone tags and mobile tags into a discovery phase, where each zone tag sends discovery messages with the zone tag's ID; and
mobile tags search for discovery messages from zone tags, and form a list of zone tags whose discovery messages the mobile tag detects, referred to as the mobile tag's tag-zone tag-proximity-list.

10. The system of claim 9, whereby mobile tags make range measurements with the zone tags in the mobile tags' tag-zone tag-proximity-list, send the measurements to the position server, and the position server makes an estimate of the mobile tags' position location using the range measurements.

11. A process for determining relative location of a zone tag within transmission a local monitoring zone of a wireless network comprising the steps of:
providing a plurality of zone tags comprising configured zone tags whose location is known and an un-configured zone tag whose location is not known, said zone tags having a wireless transceiver configured to communication over said wireless network;
placing the configured zone tags in said local monitoring zone, each of said configured zone tags at a known position and stored on a position server;
placing an un-configured zone tag within said local monitoring zone, said un-configured zone tag communicating wirelessly with said plurality of configured zone tags;
and receiving, by said position server, un-configured zone tag to said configured zone tags communication times and determining a relative position of said un-configured zone tag as a function of said communication times.

12. The process of claim 11 wherein said plurality of zone tags comprises at least three zone tags.

13. The process of claim 11 wherein said un-configured zone tag to said plurality of zone tags wireless communication is triggered by said un-configured zone tag broadcasting a discovery message, said discovery message including said un-configured zone tag's identifier.

14. The process of claim 11 wherein said position server generates an alert upon receiving insufficient data to accurately determine said un-configured zone tag position.

15. The process of claim 11 wherein said position server monitors for position changes of said un-configured zone tag.

16. The process of claim 15 further providing a motion sensor coupled with each of said zone tags, wherein said position server receives motion sensor data.

17. The process of claim 15 wherein said position server compares periodic round trip delay or time of arrival measurements with historic round trip delay or time of arrival measurements in order to determine un-configured zone tag movement.

18. The process of claim 15 wherein said position server compares periodic radio signal strength measurements with historic radio signal strength measurements in order to determine un-configured zone tag movement.

19. The process of claim 11 further providing at least one mobile tag, for securing to an asset within said transmission zone, said mobile tag having a wireless transceiver configured to communication over said wireless network;
associating each said mobile tag with at least one of said configured zone tags;
determining relative position of said mobile tag as a function of configured zone tag to mobile tag communication time.

20. The process of claim 19 wherein said mobile tag to said zone tag wireless communication is triggered by said mobile tag broadcasting a discovery message, said discovery message including said mobile tag's identifier.

* * * * *